K. DE VRIES.
SAFETY ATTACHMENT FOR BICYCLES.
APPLICATION FILED JULY 12, 1916.
1,354,896.
Patented Oct. 5, 1920.
2 SHEETS—SHEET 1.
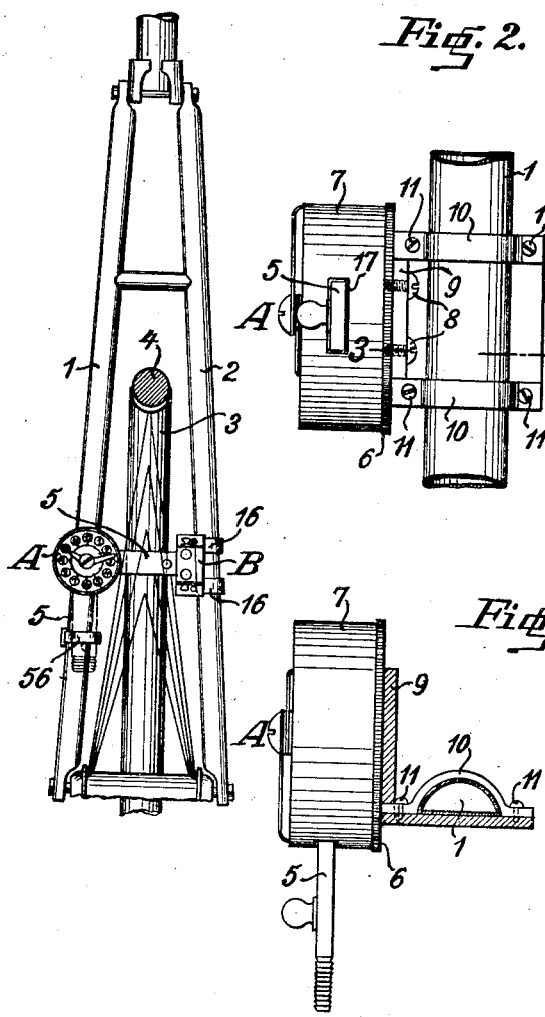
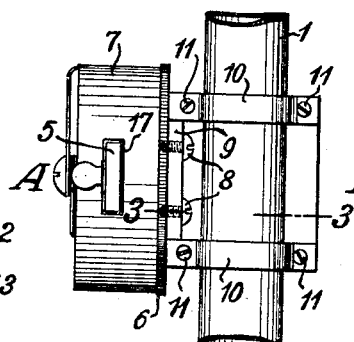
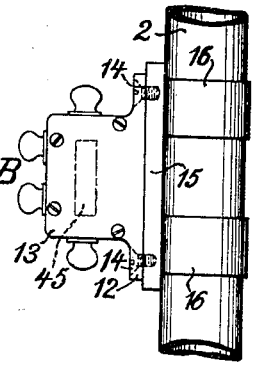
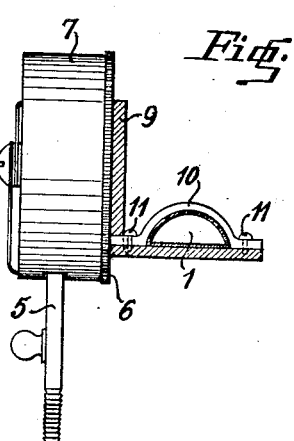
Inventor
Klaas de Vries
by John Lovka
Attorney

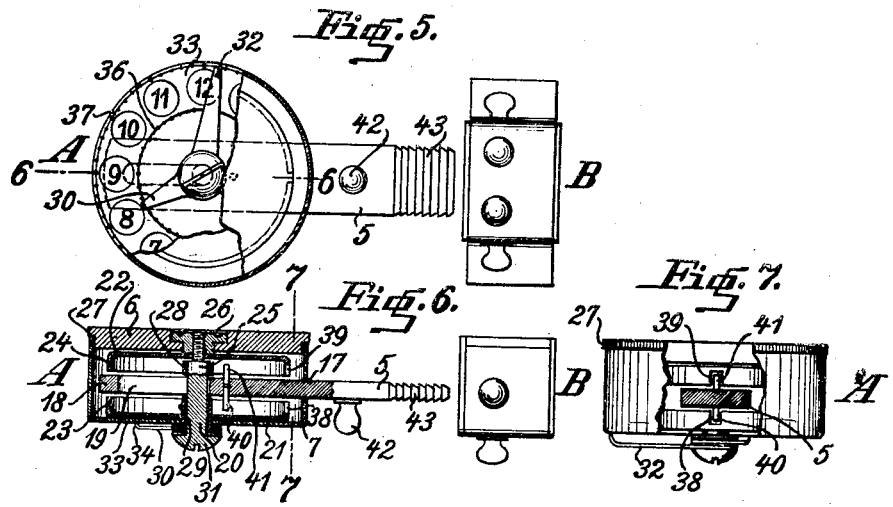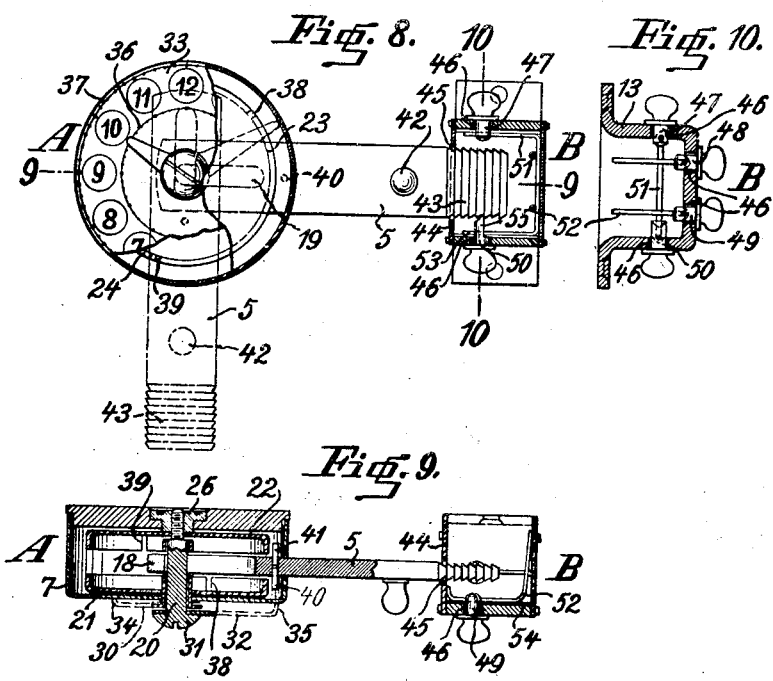

UNITED STATES PATENT OFFICE.

KLAAS DE VRIES, OF UTRECHT, NETHERLANDS.

SAFETY ATTACHMENT FOR BICYCLES.

1,354,896.  Specification of Letters Patent.  Patented Oct. 5, 1920.

Application filed July 12, 1916. Serial No. 108,854.

*To all whom it may concern:*

Be it known that I, KLAAS DE VRIES, a citizen of the Kingdom of the Netherlands, and resident of Utrecht, Netherlands, have invented a certain new and useful Safety Attachment for Bicycles or the like, of which the following is a specification.

My invention relates to a safety attachment for bicycles or the like, the object of which is to prevent unauthorized persons from riding on or stealing the bicycle or other vehicle to which the attachment is applied. More particularly, my invention relates to an attachment of that type in which a locking bar is caused to project between the spokes of a wheel of the vehicle so as to prevent revolution of the wheel. The arrangement is such that the locking bar can only be withdrawn after it has been released by an additional locking device or keeper coöperating with it. As compared with apparatus of this type heretofore in use, in which the locking bar coöperates with only one locking means, such as a combination-control, I achieve an improvement by connecting either end of the locking bar with a locking means, e. g. on either fork member, if the attachment is applied, to the front or rear fork of a bicycle, such locking means preventing movement of the bar unless they are both released. By these means, I greatly increase the safety of my apparatus since it is practically impossible that any person unacquainted with the combination to which the lock has been set should be able to release both locking means of the bar with two hands, whereas a single combination-controlled lock can without great difficulty be released by experimenting until the given combination has been found.

I prefer to enhance the difficulty of releasing my improved safety attachment by combining with a locking bar two locking means of different construction, one of which is similar to a combination lock while the other has a number of locking lugs a part of which only are operative and the others are dummies.

This construction has the further advantage over known apparatus that the detents act immediately on the locking bar, with the result that the attachment is simple, compendious and durable.

Reference is to be had to the accompanying drawings in which I have illustrated my invention by way of example, and in which:

Figure 1 is an elevation showing my safety attachment as applied to the rear fork of a bicycle; Fig. 2 illustrates, on a larger scale, the means for clamping the lock on one of the fork members; Fig. 3 is a section, partly in plan view, on line 3—3 of Fig. 2; Fig. 4 illustrates the means for clamping on the other fork the keeper coöperating with the lock; Fig. 5 is an elevation of the lock and the keeper showing the locking bar released, part of the casing and the upper detent being broken away; Fig. 6 is a plan view of the lock and keeper, partly in section on line 6—6 of Fig. 5; Fig. 7 is a detail view of the lock, partly in section on line 7—7 of Fig. 6; Figs. 8 and 9 are illustrations corresponding to Figs. 5 and 6, showing the safety attachment in operation, Fig. 9 being a section on line 9—9 of Fig. 8; Fig. 10 is a vertical section on line 10—10 of Fig. 8, the bar 5 being omitted.

The safety attachment comprises a lock A and a keeper B which are secured, respectively, on the rods 1 and 2 of the rear fork of a bicycle. When the attachment is in operation, a bar 5 projects between the spokes 3 of the rear wheel 4, connecting the lock A with the keeper B.

In the construction shown, the base plate 6 of the casing 7 of lock A is fixed on an angular bracket 9 (Figs. 2 and 3) by means of screws 8. This bracket is secured to the fork rod 1 by two clamping members 10 and screws 11. Opposite the lock A, the keeper B is secured to the other fork rod or member 2, (Fig. 1) its base plate 12 being connected with a bracket 15 by means of screws 14, such bracket having two clamping members 16, 16 engaging fork rod 2, as clearly shown in Fig. 4.

The lock A and keeper B are constructed as follows:

The cylindrical casing 7 of lock A is provided with a slot 17 in which slides the locking bar 5. The inner end of said bar is guided on a central stud 20 by means of a slot 19. The stud 20 supports two detents 21 and 22 which are bent at their rims so as to form inwardly projecting annular flanges 23 and 24 at right angles to their flat central portions. The inner end 18 of bar 5 is between said annular flanges 23 and 24. The detent 22 is fixed on the end 25 of stud 20 which end is reduced in diameter and threaded. A shouldered bushing 26 is placed on this threaded portion of stud 20 and, after detent 22 has been properly adjusted, is rigidly connected with it, e. g. by soldering. It follows that casing 7 with the parts it contains is free to revolve on base plate 6. A tubular distance piece 28 on stud 20 is inserted between the central portion of detent 22 and bar 5. The other detent 21, which is opposite detent 22, is fixed on a bush 29 which is free to revolve on stud 20. The outer end of bush 29 is rigidly connected with an arm 30 formed like the short or hour-hand of a clock. A second arm 32, corresponding to the long or minute-hand of a clock is fixed to the outer head 31 of stud 20. The front cover 33 of casing 7 is dialed like a clock. The hands 30 and 32 are elastic and provided at their ends with inwardly projecting lugs 34 and 35, respectively, which are adapted to engage notches or the like 36 and 37 formed on the face of cover 33. This facilitates the exact setting of hands 30 and 32.

The annular flanges 23 and 24 of detents 21 and 22 have each a vertical recess 38 and 39, respectively. These recesses coöperate with locking-pins 40 and 41 projecting on either side of the inner end of bar 5 in such a manner that the bar is only free to move past flanges 23 and 24 when both recesses are registering, see Fig. 7. It will thus be understood that there are three sets of parts each of which is mounted to turn independently of the others, relatively to the base plate 6, about the axis of the stud 20, viz: first, the casing 7 and the cover or dial 33, with the bar 5; second, the stud 20 with the bush 26, detent 22, and hand 32; and, third, the detent 21 with the bush 29 and hand 30.

This position of the detents 21 and 22 corresponds to a predetermined relative position of hands 30 and 32 on dial 33. In the construction illustrated, recesses 38 and 39 will register when the hands indicate one minute past eight. In any other position of the hands, and, consequently, of the detents 21 and 22, pins 40 and 41 are retained by the annular flanges 23 and 24. It follows that the movement of bar 5 is controlled by the position of detents 21 and 22 which are set by means of hands 30 and 32 in the manner of a combination-lock.

The locking bar 5, as already mentioned, coöperates with a keeper B which is arranged opposite the outer end 43 of the bar and constructed as follows:

The casing 13 of keeper B is closed except for a slot 45 in that wall 44 which faces bar 5. This slot forms a passage for the end 43 of bar 5, see Figs. 4, 8 and 9. On either side of and above slot 45, openings 46 are provided in the casing 13 through which project pins 47, 48, 49 and 50. All the pins are in the same vertical plane and provided with knobs by which they may be pulled out of the casing. The inner ends of said pins project into casing B. The pins 47 and 50 in the lateral walls of casing 13 are connected with a U-shaped wire-spring 51 the ends of which engage perforations in pins 47 and 50. A similar spring 52 coöperates with the pins 48 and 49 on the upper wall of casing 13. All the pins are drawn into the casing by the action of springs 51 and 52 so that their knobs firmly engage the walls of casing 13 but may be pulled out for a short distance against the action of their springs. When the knobs are pulled out, their springs 51 and 52 enter grooves 53 and 54, respectively, formed in the inside of the casing walls, see Figs. 8 to 10.

Several of the pins 47, 48, 49 and 50, or only one of them, say pin 50, is provided with a lug 55. The outer end 43 of bar 5 is provided with teeth which, when the bar is inserted into casing 13 through slot 45, are engaged by lug 50 under the action of spring 51, so that the end of the bar is retained in keeper B. The inner ends of the other pins, 47, 48, and 49, are rounded and unable to lock the bar. They are only dummies while pin 50 is the only operative locking member.

The operation of my safety-attachment is as follows:

When it is desired to operate the attachment the hands of lock A are set so as to form the combination corresponding to that position in which the recesses 38 and 39 of detents 21 and 22 allow pins 40 and 41 to pass. Obviously, this combination is known only to the initiated. In this position in which, as illustrated, the hands 30 and 32 indicate one minute past eight on dial 33, the bar 5 is free to be moved to the right, to facilitate which it may have a handle 42, until its toothed end 43 passes through slot 45 of casing 13 and is retained by lug 55 of pin 50. The position of the hands 30 and 32 is then altered until the recesses 38 and 39 are no longer registering or at least no longer both in the path of the pins 40, 41, see Figs. 8 and 9. Now, it is impossible to move bar 5 even if lug 55 is withdrawn from the teeth of end 43 because any attempt to move bar 5 to the left will be frustrated by pins 40 and 41 engaging the annular flanges 23 and 24 of detents 21 and 22.

In order to release bar 5 so as to permit the wheel 4 to revolve it is necessary to fulfil two conditions: Lock A must be set to the predetermined combination, one minute past eight in the present instance, in which the bar 5 is released by the detents, and pin 50 of keeper B must be pulled out of casing 13 against the action of spring 51 so as to release the toothed end 43 of bar 5. The bar may now be moved to the left, its pins being free to pass the registering recesses of detents 21 and 22. After the bar has been withdrawn, see Figs. 5 and 6, the casing 7 of the lock A may be revolved on its base plate 6 together with the bar 5 so that the bar recedes from between the spokes 3 of wheel 4, see Figs. 1 and 8, and the wheel is free to revolve. Preferably, the bar is held in its inoperative position by a curved spring 56 on fork member 1, see Fig. 1, or any other suitable means.

It will be obvious from the foregoing description that it is extremely difficult for an unauthorized person to release my safety attachment because that person would not only have to know the combination of lock A but also the action of pin 50 on the keeper B to enable him to simultaneously set the lock A and to withdraw pin 50 so as to release bar 5. As both hands are required for setting and operating the lock A and the keeper B it is practically impossible to find out the releasing position by way of experimenting.

The constructional details of my improved safety attachment may be modified in various ways without departing from the spirit of my invention.

I claim:

1. In a safety attachment for bicycles or the like, a lock having a bar adapted to project between the spokes of a wheel of said bicycle or the like, annular detents mounted to revolve on a common stud on either side of said bar, recesses in said annular detents, locking means on said bar adapted to coöperate with said recesses, and a keeper adapted to coöperate with said locking bar and having means for locking and releasing said bar.

2. In a safety attachment for bicycles or the like, a lock having a bar adapted to project between the spokes of a wheel of said bicycle or the like, annular detents mounted to revolve on a common stud on either side of said bar, recesses in said annular detents, locking means on said bar adapted to coöperate with said recesses, means for setting said annular detents, and a keeper adapted to coöperate with said locking bar and having means for locking and releasing said bar.

3. In a safety attachment for bicycles or the like, a lock having a bar adapted to project between the spokes of a wheel of said bicycle or the like, annular detents mounted to revolve on a common stud on either side of said bar, recesses in said annular detents, means for placing said recesses in registering position, locking pins on either side of said bar and adapted to pass through said registering recesses, and a keeper adapted to coöperate with said locking bar and having means for locking and releasing said bar.

4. In a safety attachment for bicycles or the like, a lock having a bar adapted to project between the spokes of a wheel of said bicycle or the like, annular detents mounted to revolve on a common stud on either side of said bar, recesses in said annular detents, hands and a dial outside said casing for placing said recesses, in registering position, locking pins on either side of said bar adapted to pass through said registering recesses, and a keeper adapted to coöperate with said locking bar and having means for locking and releasing said bar.

5. In a locking device, detents located adjacent to each other and adapted to turn about the same axis, but independently of each other, separate hands each connected positively with one of said detents, a casing mounted to turn relatively to said detents, about the same axis, and a dial connected with said casing positively and coöperating with said hands, a locking bar held to turn with said casing, but slidable lengthwise relatively thereto when both detents are in a predetermined position, and a keeper for engaging said bar when projected.

In testimony whereof I have signed this specification.

KLAAS DE VRIES.

Witnesses:
  D. KLEYN,
  K. V. WROOYAW.